No. 892,470. PATENTED JULY 7, 1908.
H. L. VAN VALKENBURG.
SYSTEM OF DISTRIBUTION.
APPLICATION FILED SEPT. 29, 1906.
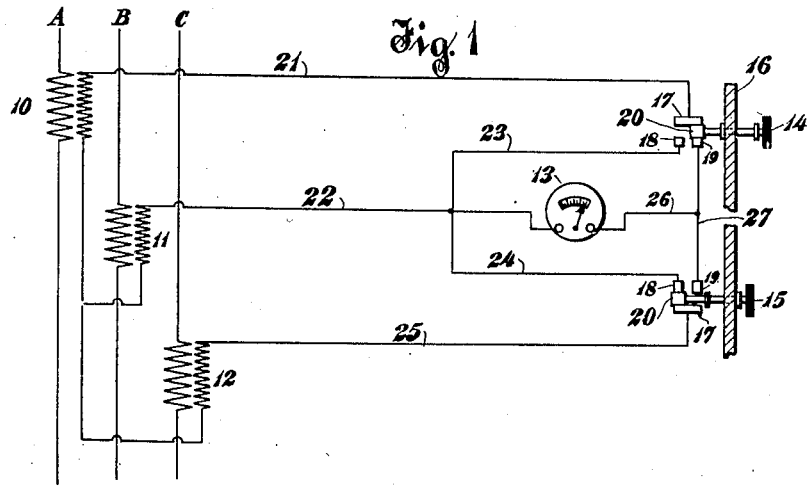
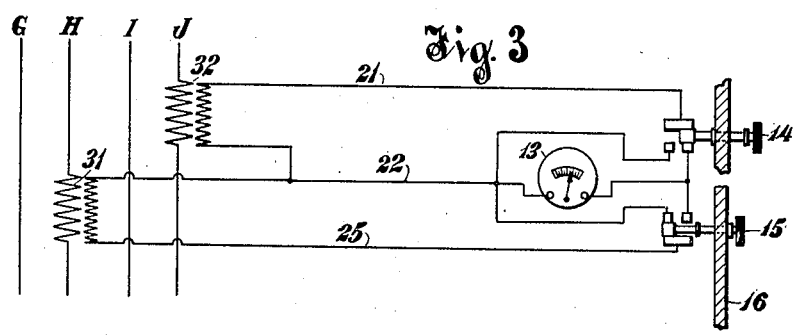
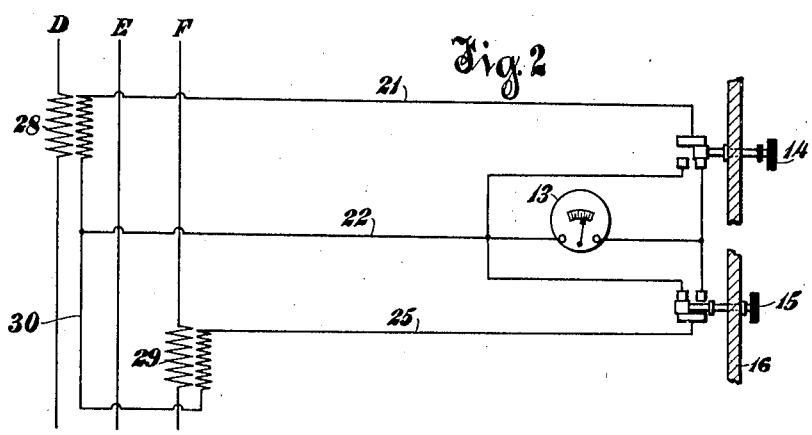
Witnesses
Oliver W. Sharman
Fred J. Kinsey
Inventor
Hermon L. Van Valkenburg
By
Chas. E. Lord
Attorney

UNITED STATES PATENT OFFICE.

HERMON L. VAN VALKENBURG, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

SYSTEM OF DISTRIBUTION.

No. 892,470.

Specification of Letters Patent.

Patented July 7, 1908.

Application filed September 29, 1906. Serial No. 336,670.

*To all whom it may concern:*

Be it known that I, HERMON L. VAN VALKENBURG, citizen of the United States, residing at Norwood, in the county of Hamilton and State of Ohio, have invented certain new and useful Improvements in Systems of Distribution, of which the following is a full, clear, and exact specification.

My invention relates to systems of distribution and particularly to ammeter connections for polyphase systems.

It is frequently desirable to measure the current of a polyphase system by a single ammeter on account of the expense of providing a number of instruments, or for other reasons. This is usually accomplished by means of short-circuiting single-throw plug switches arranged on the switch-board for connecting the instrument to the secondaries of series or current transformers in the main circuit. The method heretofore employed for connecting the instrument to the series transformers is objectionable for the reason that there is danger of open-circuiting the series or current transformers and furthermore the manipulation of the switches is rather complicated.

The object of my invention is to provide convenient means for quickly and easily transferring an ammeter from one circuit to another or from one phase of a polyphase system to another, and in such a manner that none of the series or current transformers can possibly be open circuited.

My invention consists in the combinations and arrangements of parts described in the specification and set forth in the appended claims.

Reference is now had to the accompanying drawings in which

Figure 1 shows a portion of a three-phase system of distribution having three transformers to any of which an ammeter is adapted to be connected according to my invention; Fig. 2 is a diagram showing a three-phase system provided with two series transformers to which the ammeter is adapted to be connected according to my invention to measure the current in any one of the three phases; and Fig. 3 is a diagram showing a two-phase system equipped with my invention.

Referring now to the figures of the drawing I have shown at A, B and C three conductors of a three-phase distributing circuit.

At 10 and 11 and 12 are shown three series or current transformers having primaries located in the conductors A, B and C respectively, and secondaries connected in Y.

At 13 is shown a measuring instrument in this case an ammeter which may be conveniently and quickly connected to the transformers to measure the current in any one of the phases, as will now be described.

At 14 and 15 are shown two double-throw instrument switches which may be mounted on the same or different switch-board panels 16. I have in this case shown "push and pull" double-throw switches, but I do not wish to be confined to this type of switch. The contacts of each switch are arranged at the rear of the switch-board and the handles are arranged for operation at the front. In this case each switch is provided with stationary contacts 17, 18 and 19 and with a movable bridging contact 20. The switch contacts are connected to each other, to the instrument, and to the transformer as follows:—One terminal of the secondary of transformer 10 is connected to switch 14 by conductor 21. One terminal of the secondary of transformer 11 is connected to one side of the instrument 13 and to the contacts 18 of both switches 14 and 15 by conductors 22, 23 and 24. One terminal of the secondary of transformer 12 is connected to contact 17 of switch 15 by conductor 25. The two contacts 19 of the two switches are connected to each other and to the opposite side of the instrument 13 by conductors 27 and 26. The contacts of the switches are so constructed and arranged that when the movable switch member is moved from one extreme position to the other, the contact 20 engages with one of the two contacts 18 or 19 before it leaves the other. This is a very important feature, for, as will be explained, the series transformers can not be open circuited, and thus the danger of a high rise in voltage and a destruction of the transformers is avoided.

The purpose of the connections shown and the method of manipulating the switches will now be briefly described. When the switches are both in the "in" position, contacts 17 and 18 of each switch are bridged by the movable switch contact member, and the instrument 13 is disconnected from all the transformers 10, 11 and 12. However the upper ends of all the secondaries are connected to the common junction point of the conductors 22, 23 and 24, and so said secondaries are connected in Y at both ends. If it is desired to connect the instrument to measure the current in conductor A, the switch 14 is moved to the "out" position, switch 15 being left in the "in" position. The instrument is now connected in that leg of the Y from the upper ends of the secondaries which leads from the secondary of transformer 10. If it is desired to connect the instrument to measure the current in conductor B, both switches are placed in the "out" positions. The instrument is now connected in that leg of the Y from the upper ends of the secondaries which leads from the secondary of transformer 11. If it is desired to connect the instrument to measure the current in conductor C, switch 14 is placed in its "in" position and switch 15 in its "out" position. The instrument is now connected in that leg of the Y from the upper ends of the secondaries which leads from the secondary of transformer 12. Thus it is seen that by the two double-throw switches, the instrument can be so connected as to measure the current in any one of the phases, and can be disconnected from all the transformers or quickly changed from one transformer to another without danger of any of the transformers being open circuited.

Referring now to Fig. 2, I have shown a three-phase system consisting of conductors D, E and F in which only two series transformers, 28 and 29, are employed, the primaries of the transformers being located in the conductors D and F. The only difference between the connections here shown and the connections shown in Fig. 1 is that conductor 22, instead of being connected to the common junction point of the lower ends of the various transformer secondaries through one of said secondaries, is connected directly to such point; i. e. to the conductor 30, which connects the secondaries of transformers 28 and 29. In other words, the transformer 11 of Fig. 1 is simply omitted. The switches 14 and 15, instrument 13, and connections are otherwise identical with those first described. As in the first instance, when both switches 14 and 15 are in the "in" position the instrument 13 is disconnected from the system and the two secondaries are short-circuited. When the switch 14 is in the "out" position and switch 15 in the "in" position the instrument is in series with the secondary of the transformer 28 and measures the current in conductor D. When both switches are in the "out" position the instrument is in series with conductor 22 and measures resultant of the currents in conductors D and F or the current in conductor E. When switch 14 is in the "in" position and switch 15 in the opposite position the instrument is connected in series with the secondary of transformer 29 and measures the current in conductor F.

In Fig. 3 I have shown my invention applied to a two-phase system consisting of the conductors G, H, I and J. Located in conductors H and J are the primaries of two transformers 31 and 32, the secondaries of which are connected together, to the switches 14 and 15, and to the instrument 13 in exactly the same manner as in Fig. 2. When both switches are in the same position, whether "in" or "out", the instrument is disconnected from the system. When switch 14 is in the "out" position and switch 15 in the "in" position the instrument is connected in series with the secondary of transformer 32 and measures the current carried by conductors I and J. When the switches are reversed so that switch 14 is in its "in" position and switch 15 in its "out" position, the instrument is connected in series with the secondary of transformer 31 and measures the current carried by conductors G and H.

It is seen that with the two switches I can quickly transfer the instrument to either phase of a three phase circuit having either two or three transformers, or with the same number of switches to either phase of a two phase circuit without a possibility of either transformer being open-circuited. Also with the same number of switches in a similar manner I can measure the current in either phase of a two phase circuit.

I have shown my invention applied to polyphase systems of distribution but I do not wish to be confined to these systems, as my invention can be applied to two or more independent single phase systems of distribution.

I do not wish to be confined to the exact details shown, but aim in my claims to cover all modifications and changes which do not involve a departure from the spirit and scope of my invention.

What I claim as new and desire to secure by Letters Patent is:—

1. In a polyphase system of distribution, a plurality of series transformers, a measuring instrument, and a plurality of double-throw instrument switches for connecting said instrument to any one of said transformers without open-circuiting any of the latter.

2. In a polyphase system of distribution, a plurality of series transformers, a measuring instrument, and instrument switches for connecting said instrument to said transformers so as to measure the current in any one phase, the switches being so constructed that the transformers can never be open-circuited.

3. In a polyphase system of distribution, a plurality of series transformers, a measuring instrument, and a plurality of double-throw instrument switches for connecting said instrument to said transformers so as to measure the current in any one phase, the switches being so constructed that the transformers can never be open-circuited.

4. In a polyphase system of distribution, a plurality of series transformers, a measuring instrument, and a plurality of "pull and push" switches for connecting said instrument to said transformers so as to measure the current in any one phase, the switches being so constructed that the transformers can never be open-circuited.

5. In a polyphase system of distribution, a plurality of series transformers, a measuring instrument, a plurality of double-throw instrument switches, and connections between the transformers, instrument, and switches whereby the instrument can be connected to any one of said phases, said switches being so constructed that in throwing a switch from one position to another the movable switch contact member engages the second contact before leaving the first, whereby the transformers can never be open circuited.

6. In a polyphase system of distribution, a plurality of series transformers, a measuring instrument, a plurality of double-throw "pull and push" instrument switches, and connections between the transformers, instrument and switches whereby the instrument can be connected to any one of said phases, said switches being so constructed that in throwing the switch handles from one position to another the movable switch member engages the second contact or group of contacts before leaving the first, whereby the transformers can never be open circuited.

7. In combination, a three-phase system of distribution, a plurality of series transformers, a measuring instrument, and two double-throw instrument switches for connecting the instrument to any one of the phases.

8. In combination, a three-phase system of distribution, a plurality of series transformers, a measuring instrument, and a pair of double-throw instrument switches so connected together, to the instrument, and to the transformers that by manipulating the switches the instrument can be connected to any one of said phases.

9. In a three-phase system of distribution, a plurality of series transformers, a measuring instrument, and a pair of double-throw instrument switches so connected together, to the instrument and to the transformers that by manipulating the switches the instrument can be connected to any one of the phases of the system, the switches being so constructed that in throwing the instrument from one phase to another the transformers can not be open-circuited.

10. In combination, a plurality of circuits, a plurality of series transformers, a measuring instrument, and a plurality of double-throw switches for connecting the instrument to said transformers so as to measure the current in any one of said circuits, the parts being so constructed and connected that the series transformers can not be open circuited.

11. In combination, a plurality of current carrying conductors, series or current transformers connected to said conductors, an ammeter, and a plurality of double-throw instrument switches having contacts so connected together, to the instrument, and to the transformers that said ammeter can be connected in series with the secondary of any transformer without the possibility of open-circuiting the secondary of any other transformer.

In testimony whereof I affix my signature, in the presence of two witnesses.

HERMON L. VAN VALKENBURG.

Witnesses:
ARTHUR F. KWIS,
FRED J. KINSEY.